United States Patent
Zuffa

(10) Patent No.: US 11,834,229 B2
(45) Date of Patent: Dec. 5, 2023

(54) CAP WITH REDUCED THICKNESS

(71) Applicant: SACMI COOPERATIVA MECCANICI IMOLA SOCIETA' COOPERATIVA, Imola (IT)

(72) Inventor: Zeno Zuffa, Borgo Tossignano (IT)

(73) Assignee: SACMI COOPERATIVA MECCANICI IMOLA SOCIETA' COOPERATIVA, Imola (IT)

(*) Notice: Subject to any disclaimer, the term of this patent is extended or adjusted under 35 U.S.C. 154(b) by 0 days.

(21) Appl. No.: 17/654,414

(22) Filed: Mar. 11, 2022

(65) Prior Publication Data

US 2022/0297896 A1    Sep. 22, 2022

(30) Foreign Application Priority Data

Mar. 18, 2021    (IT) .................. 102021000006557

(51) Int. Cl.
  *B65D 41/34*   (2006.01)
  *B29C 45/26*   (2006.01)
  *B29C 45/72*   (2006.01)
  *B65D 41/32*   (2006.01)
  (Continued)

(52) U.S. Cl.
  CPC .......... *B65D 41/3423* (2013.01); *B29C 45/26* (2013.01); *B29C 45/7207* (2013.01);
  (Continued)

(58) Field of Classification Search
  CPC ........... B65D 41/3433; B65D 41/3428; B65D 41/3423; B65D 41/34; B65D 41/325;
  (Continued)

(56) References Cited

U.S. PATENT DOCUMENTS 4,407,422 A * 10/1983 Wilde ................... B65D 41/34
                                                                      215/350
4,572,388 A *  2/1986 Luker ................ B65D 41/3428
                                                                      215/252

(Continued)

FOREIGN PATENT DOCUMENTS

AU    2019204356 B1    7/2020
EP      1526086 A2 *   4/2005    ......... B65D 41/3447

(Continued)

*Primary Examiner* — Robert J Hicks
(74) *Attorney, Agent, or Firm* — Pearne & Gordon LLP; Bryan M. Gallo

(57) ABSTRACT

A cap (1) for a container comprises: a body (2), configured to be coupled and uncoupled relative to the neck of the container and including an internally threaded side wall (21), which extends around a longitudinal axis (A), and a transverse wall (22); a tamper evident ring (3), including a retaining element (31), configured to engage a locking member on the neck of the container, and a joining portion (32), where the tamper evident ring (3) is joined to the cap body (2), the joining portion (32) being configured to be torn along a perimeter surrounding the longitudinal axis (A) in response to a movement of the body (2) away from the tamper evident ring (3), wherein the cap (1) comprises a connecting window (4) including a connecting band (40) and a film (400) which is thinner than the connecting band (40).

10 Claims, 8 Drawing Sheets

(51) Int. Cl.
  B65D 55/16   (2006.01)
  B29L 31/56   (2006.01)
(52) U.S. Cl.
  CPC ............ B65D 41/325 (2013.01); B65D 55/16 (2013.01); *B29L 2031/56* (2013.01); *B65D 2251/023* (2013.01); *B65D 2401/30* (2020.05)
(58) Field of Classification Search
  CPC ...... B65D 41/32; B65D 55/165; B65D 55/16; B29C 33/44; B29C 43/36
  USPC ....... 215/344, 343, 341, 253, 252, 250, 306; 220/293, 304, 288, 266, 265, 375
  See application file for complete search history.

(56) References Cited

U.S. PATENT DOCUMENTS

| | | | | |
|---|---|---|---|---|
| 5,503,282 | A * | 4/1996 | Montgomery | B65D 41/3447 215/343 |
| 5,695,083 | A * | 12/1997 | Obadia | B65D 41/3428 215/320 |
| 6,474,491 | B1 | 11/2002 | Benoit-Gonin et al. | |
| 6,491,175 | B1 | 12/2002 | Taha | |
| 2002/0000420 | A1 | 1/2002 | Taha | |
| 2002/0001637 | A1 | 1/2002 | Taha | |
| 2003/0015490 | A1 | 1/2003 | Taha | |
| 2018/0370701 | A1 | 12/2018 | Maguire | |
| 2021/0086954 | A1 * | 3/2021 | Suzuki | B65D 41/325 |
| 2021/0221572 | A1 * | 7/2021 | Migas | B65D 41/3428 |
| 2021/0229873 | A1 * | 7/2021 | Berroa García | B65D 41/3447 |
| 2021/0300648 | A1 * | 9/2021 | Bassi | B65D 41/34 |
| 2021/0316908 | A1 | 10/2021 | Lamoureux et al. | |
| 2022/0169423 | A1 * | 6/2022 | Lohrman | B65D 41/3447 |
| 2022/0185554 | A1 * | 6/2022 | Falzoni | B65D 41/34 |

FOREIGN PATENT DOCUMENTS

| | | |
|---|---|---|
| IT | MO2010A000359 | 6/2012 |
| IT | MO2010A000360 | 6/2012 |
| WO | 2020046849 | 3/2020 |

* cited by examiner

Fig.1
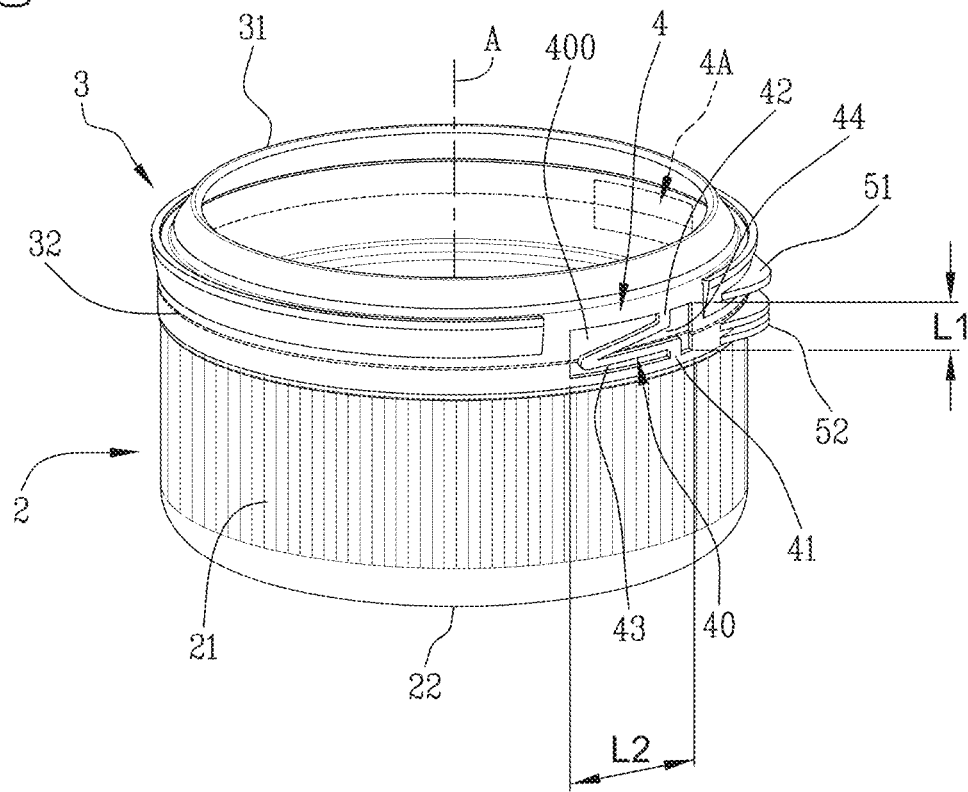
Fig.1A
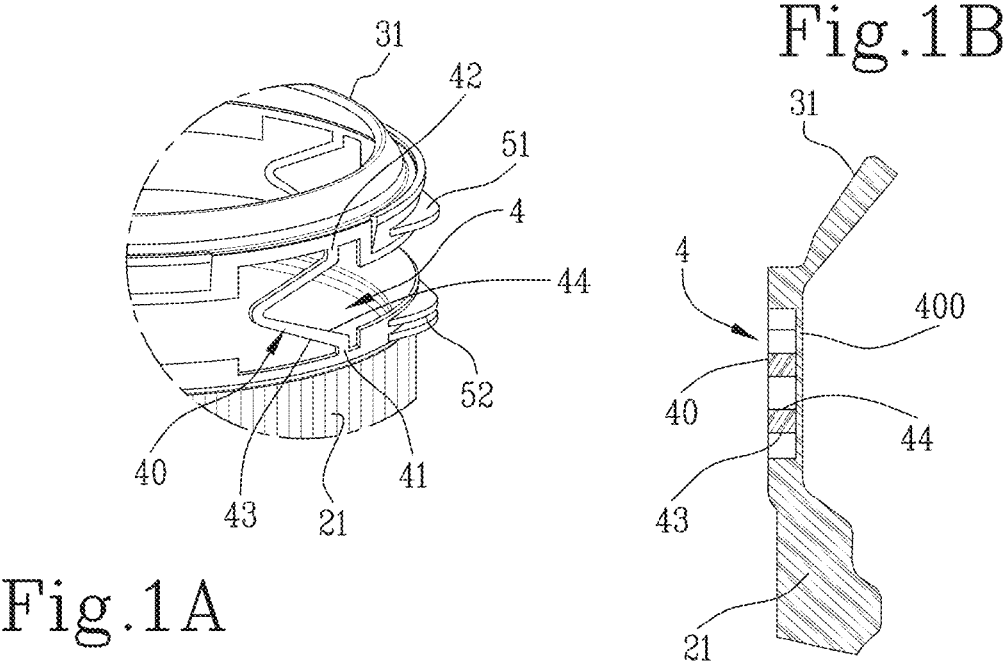
Fig.1B

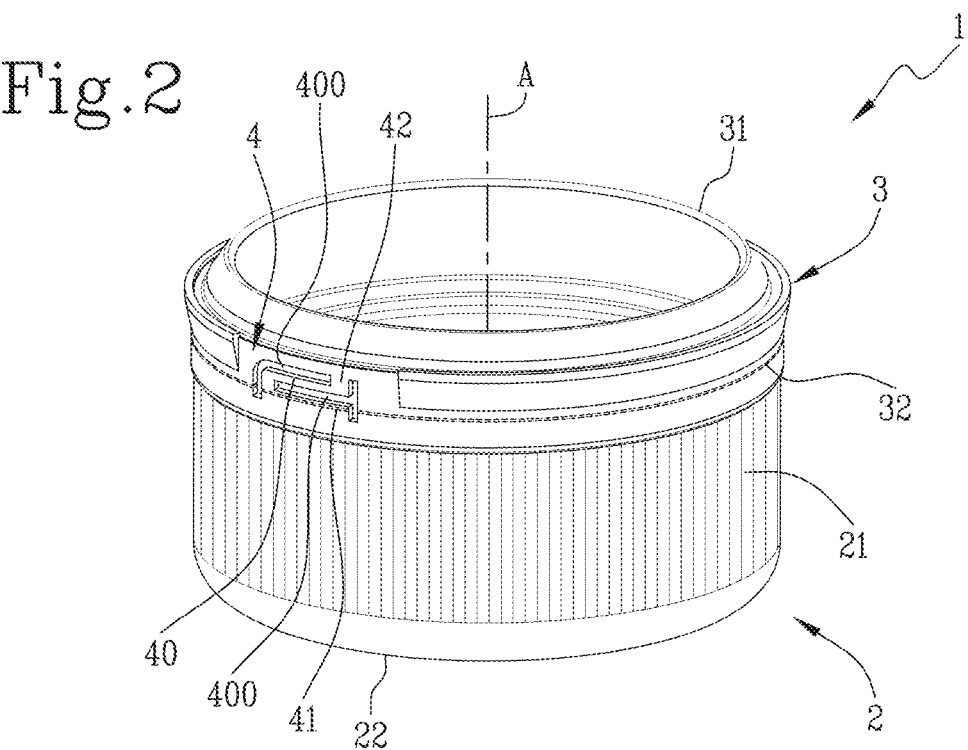
Fig.2
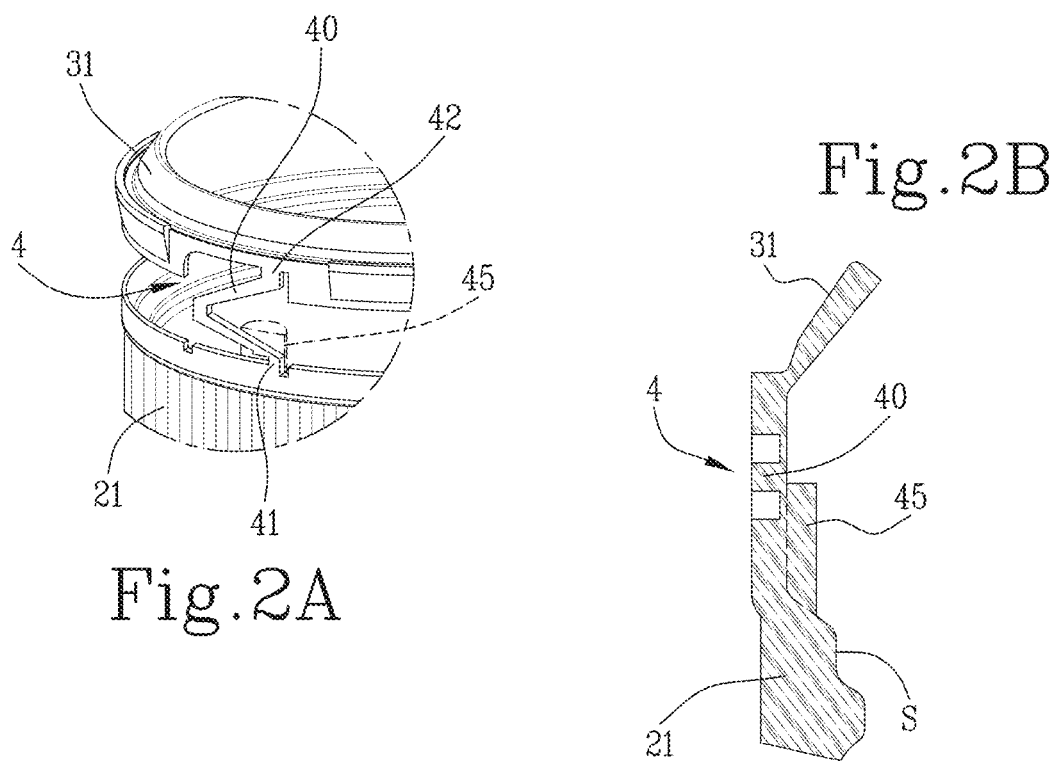
Fig.2A
Fig.2B

CAP WITH REDUCED THICKNESS

FIELD OF THE INVENTION

This invention relates to a cap for a container. The invention also relates to a method for making a cap for a container. The invention also relates to a mould for making a cap for a container.

BACKGROUND OF THE INVENTION

Conventionally, a container cap comprises a body configured to be coupled and uncoupled relative to the neck of the container and a tamper evident ring configured to remain anchored to the neck of the container even when the body is uncoupled from the neck. The body and the tamper evident ring are joined to each other by a joining portion extending around a longitudinal axis of the cap and including a series of bridges or hinges separated from each other by windows and configured to be torn when the cap is unscrewed for the first time, thereby indicating that the container has been opened.

Examples of these caps are described, for example, in patent documents MO2010A000359A1 and MO2010A000360A1. These caps, however, have the disadvantage of allowing the user to discard the cap body into the environment after opening the container, thereby creating a pollution issue. Also known in the prior art are caps where the cap body, after opening, remains connected to the tamper evident ring: besides the series of bridges intended to be torn when the cap is opened, the joining portion of these caps includes a stable connecting zone where the cap body is permanently connected to the tamper evident ring and remains connected thereto even after opening the cap; in these caps, therefore, the joining portion is not torn along the full perimeter surrounding the longitudinal axis but remains intact in the stable connecting zone. Examples of these caps are described in patent documents US20180370701A1, U.S. Pat. No. 6,474,491B1, AU2019204356B1, US2002/001637A1 and WO2020/046849A1. These caps have several disadvantages: first of all, the stable connecting zone is relatively weak and easy to tear accidentally when the cap is opened; also, when the cap is opened, the body tends to return elastically to a position where it interferes with the neck of the container, thereby making it awkward to pour the liquid out of the container.

Another problem associated with caps of this kind is that the stable connections (that is, the tethers) which connect the cap body to the tamper evident ring are sometimes too short, that is, they are not long enough to allow the cap body and the tamper evident ring to be moved well apart; as a result, the cap body tends to get in the way when the product is being poured out of the container.

Another disadvantage of these caps is that the connecting zone (where there are stable connections between the cap body and the tamper evident ring) may uncover parts of the container neck, exposing them to external contaminating agents (such as dust or dirt) from the production and market chains of the containers. These contaminating agents may settle and become ingrained in the space between the neck of the container and the cap. Thus, a person drinking from the container may ingest these contaminating agents. This poses a problem of hygiene and consumer safety.

Another issue with prior art solutions is that moulding the cap is difficult because the plastic material does not always fill the stable connecting zone uniformly, resulting in defective caps being made. Thus, the shape of the cap must allow reconciling the need for the cap to be practical to use with the issues involved in making it by moulding. More specifically, with regard to moulding, it is essential for the mould to be able to be correctly filled, without obstructions or barriers hindering the flow of the plastic in the mould. In this context, it is known that defects in caps can be the result of a mould being filled by very non-uniform flows, differing greatly in temperature and/or pressure to volume ratio in different zones of the mould. The defects include what are known as "weld lines" which are formed where the fronts of the filling flows do not blend into each other correctly and/or where backflow occurs. This disclosure has for an aim to provide a cap for a container, as well as a method and a mould for making it to overcome the above-mentioned disadvantages of the prior art.

This aim is fully achieved by the cap, method and mould of this disclosure as characterized in the appended claims.

SUMMARY OF THE INVENTION

This disclosure relates to a cap for a container. More specifically, this disclosure relates to a plastic cap for containers such as bottles for water or other beverages, oil containers or containers for non-food liquids (such as liquid soaps or detergents). This disclosure might, however, also be applicable to caps made of different materials such as metals, for example. The container includes a body, defining an internal space to contain a product, and a threaded neck.

The cap comprises a body configured to be coupled and uncoupled relative to the neck of the container. The cap body includes a side wall (or skirt) which extends around a longitudinal axis between a first and a second end (the first and the second end extending in a ring around the longitudinal axis).

Preferably, the side wall is internally threaded; the cap is thus a screw cap. The cap body includes a transverse wall joined to the first end of the side wall. Preferably, the transverse wall is oriented perpendicularly to the longitudinal axis.

The cap also comprises a tamper evident ring, configured to remain anchored to the neck of the container, even when the body is uncoupled from the neck. The tamper evident ring also extends around the longitudinal axis. The tamper evident ring includes a retaining portion configured to engage a locking member (or annular protrusion) on the neck of the container. The tamper evident ring includes a joining portion, where the tamper evident ring is joined to the cap body. More specifically, the joining portion includes a plurality of bridges or hinges spaced from each other and a plurality of windows alternated with the bridges. The joining portion is configured to be torn along a full perimeter surrounding the longitudinal axis in response to a movement of the body away from the tamper evident ring. It should be noted that the perimeter surrounding the longitudinal axis is preferably circular.

It should be noted that to open the container, the user induces a rotation of the cap (more specifically, a rotation of both the cap body and the tamper evident ring, which are connected to each other at the joining portion); since the side wall of the cap body is internally threaded and coupled to the corresponding thread on the neck of the container, rotating the cap causes it to be displaced along the longitudinal axis (specifically away from the body of the container). The neck of the container includes an abutment member configured to abut against the retaining portion of the tamper evident ring and to stop its displacement along the longitudinal axis (for example, the abutment member may have the shape of an annular portion jutting from a wall of the neck of the container). Thus, when the user induces the rotation of the cap, the cap body and the tamper evident ring are first displaced along the longitudinal axis until the tamper evident ring meets the abutment member; after that, a further rotation of the cap creates tension in the joining zone due to a force, directed along the longitudinal axis, which tends to move the body away from the tamper evident ring. This tension results in tearing of the joining zone (in particular, where present, the bridges of the joining zone are torn). Once the joining zone is torn, the cap body can continue to rotate and to move away from the tamper evident ring until it is free of the thread and uncoupled from the neck of the container, while the tamper evident ring remains coupled to the neck of the container.

The cap also comprises a connecting window, formed of a portion of the side wall of the cap body, a corresponding portion of the retaining element and the stretch of the joining portion interposed between them. The connecting window has a first dimension, along the direction of the longitudinal axis, and a second dimension, along a perimeter surrounding the longitudinal axis. The connecting window includes a connecting band.

Preferably, the length of the connecting band is greater than the first dimension of the connecting window. That way, the connecting band allows the cap to be moved away from the tamper evident ring.

In one example, the connecting band may be entirely part of the body (that is, of the portion of the body that contributes to form the connecting window). Alternatively, the connecting band may be entirely part of the tamper evident ring (that is, of the portion of the tamper evident ring that contributes to form the connecting window). In al further alternative, the connecting band may belong in part to the body (that is, to the portion of the body that contributes to form the connecting window) and in part to the tamper evident ring (that is, to the portion of the tamper evident ring that contributes to form the connecting window).

It should be noted that when the cap is being opened, the connecting band is subjected to mechanical stresses to pass from the first to the second working configuration. In one or more embodiments, when the cap opens, the connecting band is plastically deformed and increases its length. In this context, the length of the connecting band is greater than the first dimension of the connecting window both in the first working configuration and in the second working configuration.

The connecting band has a first end connected to the side wall of the body and a second end connected to the retaining portion of the tamper evident ring. The connecting band also has a first flank and a second flank, opposite to the first flank.

The connecting window includes a film which is thinner than the connecting band. For example, the film may be less than 0.7 mm thick, specifically less than 0.5 mm thick, preferably less than 0.3 mm thick and, still more preferably, less than 0.1 mm thick (for example, 0.03 mm or 0.05 mm). The film is adjacent to the first and second flanks of the connecting band to connect the first and second flanks of the connecting band to respective portions of the cap body side wall and of the retaining element which surround the connecting window. Preferably, the film is also thinner than the portions of the cap body side wall and of the retaining element which surround the connecting window; thus, the film forms a hollow in the side wall of the cap body.

Conversely, the connecting band is preferably substantially the same thickness as the portions of the cap body side wall and of the retaining element which surround the connecting window. Thus, the connecting band is in relief on the film.

Preferably, the connecting band does not protrude from the side wall of the cap body; in other words, the connecting band is substantially contained entirely within a contour of the cap. Thus, in a view of the cap from above (along a viewing axis parallel to the longitudinal axis) the connecting band is substantially not visible.

In is observed that, in one example, the film (that is, the portion with reduced thickness compared to the connecting band) is provided exclusively within the connecting window. In alternative examples, the film (that is, one or more portions with reduced thickness compared to the connecting band) may be provided also outside the connecting window. Hence, generally speaking, the present disclosure is not restricted to the situation where the film is provided exclusively within the connecting window, although this situation is one the possible embodiments.

The cap can be positioned in a first working configuration, where the retaining portion of the tamper evident ring is engaged with the locking member of the container neck, the cap body is coupled to the container neck and the joining portion of the tamper evident ring and the film of the connecting window are intact. In the first working configuration, the film provides a seal that prevents air from passing between the outside environment and a gap defined between the cap and the container neck. The cap can also be positioned in a second working configuration, where the retaining portion of the tamper evident ring is engaged with the locking member of the container neck, the cap body is uncoupled from the container neck, the joining portion of the tamper evident ring and the film of the connecting window are torn and the tamper evident ring is joined to the body by the connecting band.

In particular, the cap is in the first working configuration before the cap is opened for the first time and in the second working configuration after the cap has been opened. It should be noted that in the second working configuration, the joining portion is torn along its annular profile (except for the zone where the connecting band is); the film is also torn. The connecting band remains connected both to the cap body and to the tamper evident ring, even when the joining zone is torn. Thus, in the cap according to this disclosure, the function of connecting the cap body to the tamper evident ring to prevent the cap body from polluting the environment and the tamper evidence function indicating that the container has been opened are two distinct functions performed by different parts of the cap: the connecting function is performed by the connecting band and the tamper evidence function by the tamper evident ring and the film.

It should be noted that tearing the film reveals that the cap (that is, the container) has been opened for the first time; thus, if the film is intact, the user has the guarantee that the container has not yet been opened.

Preferably, in the first working configuration, the connecting band does not protrude from the side wall of the cap body and from the retaining portion of the tamper evident ring (because it is retained by the film); conversely, in the second working configuration, the connecting band protrudes from the side wall of the cap body and from the retaining portion of the tamper evident ring, away from the longitudinal axis (even if the cap is re-closed).

In an embodiment, the second dimension of the connecting window is greater than the first dimension of the connecting window. Preferably, the length of the connecting band is greater than the second dimension of the connecting window. More specifically, the connecting band may be obliquely inclined relative to the sides of the connecting window; alternatively, the connecting band may form a loop or a hairpin bend in the connecting window.

In an embodiment, the tamper evident ring includes a fastening element and the cap body includes a protrusion extending radially away from the longitudinal axis or, conversely, the cap body includes a fastening element and the tamper evident ring includes a protrusion extending radially away from the longitudinal axis. The fastening element and the protrusion are longitudinally aligned in the first working configuration of the cap so that, in the second working configuration of the cap, the fastening element is configured to engage the protrusion so as to keep the cap body in a flipped over position relative to the tamper evident ring. Keeping the cap body in a flipped over position relative to the tamper evident ring prevents the cap body from hampering a user who is pouring the liquid out of the container or drinking.

More specifically, in an embodiment, the fastening element may be in the form of a tooth, extending radially away from the longitudinal axis. In this case, the cap body may include a pair of protrusions forming, between them, a recess which is adapted to receive the tooth; alternatively, there may be a single protrusion with a recess in it which is adapted to receive the tooth.

In another embodiment, the fastening element may be in the form of a recess configured to receive the protrusion.

In an embodiment, the fastening element and the protrusion are made on the inside of the connecting window. In another embodiment, the fastening element and the protrusion are made on the outside of the connecting window and are angularly spaced therefrom.

In an embodiment, besides the connecting window, the cap comprises an additional connecting window including an additional connecting band. The additional connecting window and the additional connecting band include one or more of the features described with regard to the connecting window and the connecting band. Preferably, the respective second ends of the connecting band and of the additional connecting band are disposed in the retaining portion of the tamper evident ring, at the ends of a circular arc of less than 180 degrees. In other words, the respective second ends of the connecting band and of the additional connecting band are located in the same semicircle; that way, the cap body can be moved away from the tamper evident ring and flipped relative to the semicircle.

Preferably, if both the connecting window and the additional connecting window are provided, there is also a fastening element and a corresponding protrusion which are angularly spaced from the connecting window and the additional connecting window (more specifically, preferably angularly equispaced from them).

Preferably, the fastening element is interposed between the second ends of the connecting band and of the additional connecting band, relative to the circular arc within which the second ends are disposed. Thus, the fastening element is also located in the same semicircle as the respective second ends of the connecting band and additional connecting band.

In an embodiment, the respective second dimensions of the connecting window and of the additional connecting window are each at least 60 degrees (or at least 55 degrees or at least 50 degrees) measured along an arc around the longitudinal axis. More specifically, in an embodiment, the connecting window, the additional connecting window and the fastening element are angularly equispaced from each other. In this case, the fact that the respective second dimensions of the connecting window and of the additional connecting window are each at least 60 degrees means that the respective second ends of the connecting window and of the additional connecting window may be in the same semicircle.

The side wall of the cap body and the tamper evident ring define an inside surface that faces towards the longitudinal axis. In one or more embodiments, the connecting band has an increased thickness zone, protuberant radially from the inside surface at a cutting plane orthogonal to the longitudinal axis and passing through the joining portion. The increased thickness zone allows cutting the joining zone with a 360° cut from the outside. In effect, when cutting from the outside, the increased thickness zone remains at least partly intact, so the connecting band is not left loose-ended when the joining zone is cut.

In other embodiments, in which the increased thickness zone is not provided, the joining zone is cut selectively in such a way as not to cut the connecting band.

The film includes a first film portion, interposed between the first flank of the connecting band and respective portions of the cap body side wall and of the retaining element which surround the connecting window; the film also includes a second film portion, interposed between the second flank of the connecting band and respective portions of the cap body side wall and of the retaining element which surround the connecting window. Thus, the first and second film portions are separated by the connecting band; theoretically, the first and second film portions are tearable independently of each other (although, in practice, they both tear when the cap is opened).

This disclosure also relates to a method for making a cap for a container. The cap is preferably a cap according to one or more aspects of this disclosure.

The method comprises a step of forming. Made in the step of forming is a body of the cap, configured to be coupled and uncoupled relative to the neck of the container; the cap body includes a side wall which is internally threaded and extends around a longitudinal axis between a first and a second end. The cap body also includes a transverse wall joined to the first end of the side wall. Also made in the step of forming is a tamper evident ring, configured to remain anchored to the neck of the container, even when the body is uncoupled from the neck. The tamper evident ring includes a retaining portion, configured to engage a locking member on the neck of the container, and a joining portion, where the tamper evident ring is joined to the cap body; the joining portion being configured to be torn along a full perimeter surrounding the longitudinal axis in response to a movement of the body away from the tamper evident ring.

The forming step also makes a connecting window, formed of a portion of the side wall of the cap body, a corresponding portion of the retaining element and a stretch of the joining portion interposed between them. The connecting window has a first dimension, along the direction of the longitudinal axis, and a second dimension, along a perimeter surrounding the longitudinal axis. Inside it, the connecting window defines a connecting band. The connecting band has a length that is greater than the first dimension of the connecting window and is joined to the side wall of the cap body and to the retaining portion of the tamper evident ring at a first and a second end, respectively. The connecting band is also separated from (or connected to) the remaining zones of the side wall of the cap body and of the retaining portion of the tamper evident ring by a film, which is thinner than the connecting band, and is adjacent to the first and second flanks of the connecting band to connect the first and the second flank of the connecting band to respective portions of the cap body side wall and of the retaining element which surround the connecting window.

In an embodiment, the step of forming is carried out entirely by (injection or compression) moulding; hence, the connecting band and the film are made as one with the body and tamper evident ring during (injection or compression or injection compression or other method of) moulding. It should be noted that the shape of the cap of this disclosure reconciles the need for the cap to be practical to use with the need to correctly fill the mould. Thus, the shape of the cap of this disclosure allows making good quality caps which are substantially free of defects.

More specifically, the step of forming may comprise moving an upper unit and a lower unit towards each other along the longitudinal axis to define a forming cavity. The step of forming may also comprise moving a drawer, whose top surface has a groove made in it, in a direction transverse to the longitudinal axis. The direction transverse to the longitudinal axis is preferably oriented radially relative to the longitudinal axis; thus, the drawer moves towards the longitudinal axis. When the upper unit, the lower unit and the drawer are close together at a position where the mould is closed, the top surface of the drawer delimits the outside of the connecting window.

Preferably, the movement of the drawer is mechanically synchronized with the movement of the upper unit and/or of the lower unit. For this purpose, moving the upper unit or the lower unit causes the drawer to move. More specifically, the drawer has a contoured portion which is configured to interact with a corresponding, matching shaped portion of the upper unit or lower unit so that a longitudinal movement of the upper unit or lower unit towards the closed configuration of the mould causes the drawer to move transversely towards the closed configuration of the mould. That way, the drawer moves along the transverse (that is, radial) direction towards the longitudinal axis from a retracted position to an advanced position; preferably, the drawer reaches the advanced position when the upper unit comes into contact with the lower unit.

As to the contoured portion of the drawer, it might, in an example embodiment, have a frustoconical shape or a shape having at least one frustoconical generatrix, to come into contact with a corresponding matching shaped portion also having a frustoconical shape, or a shape having at least one frustoconical generatrix. In another example embodiment, the contoured portion might have the shape of a wedge having at least one inclined plane surface, to come into contact with a corresponding matching shaped portion also having the shape of a wedge having at least one inclined plane surface. Thus, the movement of the drawer is synchronized with the movement of the upper unit and of the lower unit so that a charge starts being pressed in the mould before the drawer has completed its forward movement towards the closed position of the mould.

Preferably, in the step of forming, the following are also made:
in the cap body, a fastening element (shaped, for example, like a recess or a tooth);
in the tamper evident ring, a protrusion (or a pair of protrusions), extending radially away from the longitudinal axis.

Alternatively, in the step of forming, the following are also made:
in the cap body, a protrusion (or a pair of protrusions), extending radially away from the longitudinal axis;
in the tamper evident ring, a fastening element (shaped, for example, like a recess or a tooth).

In both cases, the fastening element and the protrusion are positioned relative to each other in such a way that the fastening element can engage the protrusion to keep the cap body in a flipped over position relative to the tamper evident ring. More specifically, the fastening element and the protrusion are longitudinally aligned.

In an embodiment, in the step of forming, an additional connecting window including an additional connecting band is made; preferably, the respective second ends of the connecting band and of the additional connecting band are disposed in the retaining portion of the tamper evident ring, at the ends of a circular arc of less than 180 degrees; the fastening element is interposed between the second ends relative to that circular arc.

After the step of forming, the method may also comprise a step of incising to make an incision along at least one stretch of the joining portion of the tamper evident ring.

The incision is made with a cutting device which may be configured to cut the joining zone from the inside or the outside of the cap. Preferably, the incision is made from the outside (that is, with a cutting device that surrounds the side wall of the cap body).

In an embodiment, the incision is made by cutting along the full perimeter of the joining portion from the outside; in this case, the side wall of the cap body and the tamper evident ring define an inside surface, facing towards the longitudinal axis, and the connecting band has an increased thickness zone, protuberant radially from the inside surface at a cutting plane orthogonal to the longitudinal axis and passing through the joining portion; the increased thickness zone is at least partly unaffected by the incision. Thus, the increased thickness zone of the connecting band remains intact, even after the incision has been made. Moreover, in this embodiment, the cut made from the outside is an alternate cut, such as to make a plurality of small windows alternated with a plurality of bridges; the bridges constitute connecting portions which join the cap body and the tamper evident ring (in addition to the connecting zone formed by the increased thickness zone).

In another embodiment, the incision is made selectively by interrupting it at least at the part of the connecting band located in the joining zone. In this case, the increased thickness zone is not necessary. It is very easy for the incision to be interrupted if cutting is carried using a laser device. In this case, furthermore, the incision can be made by cutting from the inside or from the outside.

In other embodiments, the zone of weakness is made during moulding (for example, in injection moulding, windows and bridges can be made using a specifically shaped mould).

This disclosure also relates to a mould for making a cap. The cap is preferably a cap according to one or more aspects of this disclosure.

The mould is movable between an open configuration and a closed configuration. In the closed configuration, the mould defines a forming cavity. In the open configuration, the mould is configured to allow extracting the cap. The forming cavity includes a side hollow. The side hollow includes a body zone that is internally threaded and extends around a longitudinal axis between a first and a second end. The side hollow includes a joining zone that extends around the longitudinal axis and is connected to the second end of the body zone. The side hollow includes a tamper evidence zone that extends around the longitudinal axis and is connected to the joining zone.

The joining zone is thus interposed between the body zone and the tamper evidence zone. The joining zone defines a first passage between the body zone and the tamper evidence zone. The body zone is configured to form the side wall of the body of the cap; the joining zone is configured to form the joining portion of the tamper evident ring; the tamper evidence zone is configured to form the retaining portion of the tamper evident ring.

The forming cavity includes a transverse hollow, connected to the first end of the body zone of the side hollow. The transverse hollow is configured to form the transverse wall of the body of the cap.

The forming cavity also includes a connecting zone formed of respective portions of the cap body, joining and tamper evidence zones. The connecting zone includes a connecting portion and a reduced thickness zone surrounding the connecting portion.

The connecting zone is configured to form the connecting window. The connecting portion is configured to form the connecting band. The reduced thickness portion is configured to form the film.

The mould comprises an upper unit and a lower unit, movable relative to each other along the longitudinal axis between a spaced-apart position, to define the open configuration of the mould, and a close-together position, to define the closed configuration of the mould.

The mould comprises a drawer, whose top surface has a groove made in it, and the drawer is movable in a direction transverse to the longitudinal axis so that when the mould is at the closed position, where the upper unit, the lower unit and the drawer are close together, the top surface of the drawer delimits the outside of the connecting zone of the forming cavity. The transverse direction is preferably radial relative to the longitudinal axis; thus, during closure of the mould, the drawer moves from a retracted position to an advanced position, towards the longitudinal axis.

As mentioned above, the drawer preferably has a contoured portion which is configured to interact with a corresponding, matching shaped portion of the upper unit or lower unit so that a longitudinal movement of the upper unit or lower unit towards the closed configuration of the mould causes the drawer to move transversely towards the closed configuration of the mould. Thus, the drawer does not need a dedicated actuator but is driven by the effect of the movement of the upper unit or of the lower unit of the mould. This simplifies the construction and management of the mould.

In an embodiment, the mould comprises an additional drawer, whose top surface has a groove made in it, and the additional drawer is movable in a direction transverse to the longitudinal axis so that when the mould is at the closed position, where the upper unit, the lower unit and the additional drawer are close together, the top surface of the additional drawer delimits the outside of an additional connecting zone (configured to form an additional connecting window). More specifically, the additional drawer is configured to make the additional connecting window, including the additional connecting band and the additional film.

In an embodiment, the mould comprises an auxiliary drawer, movable transversely to the longitudinal axis so that when the mould is at the closed position, where the upper unit, the lower unit and the auxiliary drawer are close together, a top surface of the auxiliary drawer delimits the outside of a portion of the forming cavity to form at least one protuberant zone and one contoured zone in the forming cavity; in an embodiment, the contoured zone is also protuberant, so the auxiliary drawer is configured to form a first and a second protuberant zone in the forming cavity. Thus, the auxiliary drawer is configured to form the fastening element and the protrusion configured to engage the fastening element to keep the cap at the flipped over position. The fastening element may include a tooth; in this case, the contoured zone in the forming cavity is protuberant.

In an embodiment, the fastening element and the protrusion configured to engage the fastening element are made on the inside of the connecting window; in this case, the drawer is configured to also form the at least one protuberant zone and the contoured zone.

The drawer is movable along a first transverse axis, oriented radially relative to the longitudinal axis. The additional drawer, if provided, is movable along a second transverse axis, also oriented radially relative to the longitudinal axis. The auxiliary drawer, if provided, is movable along a third transverse axis, also oriented radially relative to the longitudinal axis. Preferably, the third transverse axis is interposed between, and angularly equidistant from, the first and the second transverse axis. More specifically, in an embodiment, the first, second and third transverse axes are angularly equispaced around the longitudinal axis.

The additional drawer and/or the auxiliary drawer may include one or more of the features of the drawer; more specifically, the additional drawer and/or the auxiliary drawer may include a respective contoured portion which is configured to interact with a corresponding, matching shaped portion of the upper unit or lower unit so that a longitudinal movement of the upper unit or lower unit towards the closed configuration of the mould causes the additional drawer and/or the auxiliary drawer to move transversely towards the closed configuration of the mould.

As to the contoured portion of the auxiliary drawer and/or of the additional drawer, it might, in an example embodiment, have a frustoconical shape or a shape having at least one frustoconical generatrix, to come into contact with a corresponding matching shaped portion also having a frustoconical shape, or a shape having at least one frustoconical generatrix. In another example embodiment, the contoured portion might have the shape of a wedge having at least one inclined plane surface, to come into contact with a corresponding matching shaped portion also having the shape of a wedge having at least one inclined plane surface.

BRIEF DESCRIPTION OF THE DRAWINGS

These and other features will become more apparent from the following description of a preferred embodiment, illustrated by way of non-limiting example in the accompanying drawings, in which:

FIG. 1 shows an embodiment of a cap of this disclosure, in a first working configuration;

FIG. 1A shows a detail of the cap of FIG. 1 in a second working configuration;

FIG. 1B shows a cross section of a detail of the cap of FIG. 1;

FIG. 2 shows a further embodiment of a cap of this disclosure, in a first working configuration;

FIG. 2A shows a detail of the cap of FIG. 2 in a second working configuration;

FIG. 2B shows a cross section of a detail of the cap of FIG. 2;

DETAILED DESCRIPTION OF THE PREFERRED EMBODIMENTS OF THE INVENTION

Figure 3:
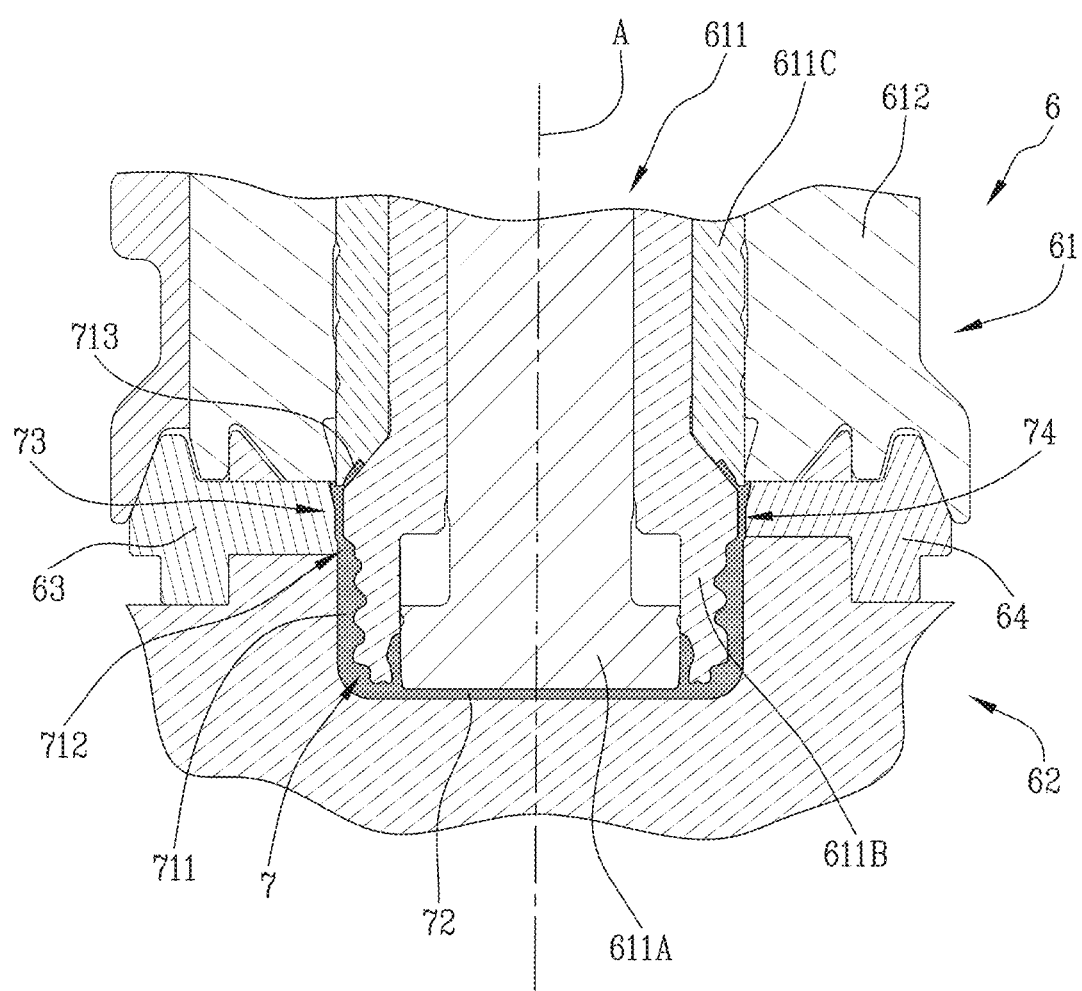
FIG. 3 shows a mould of this disclosure at a working position.
Figure 4A:
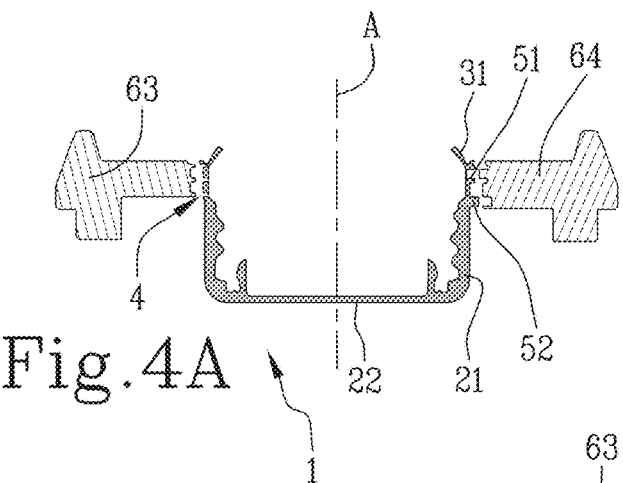
FIGS. 4A and 4B show respective cross sectional views of a drawer and an auxiliary drawer of the mould of FIG. 3 at an open position and at a closed position, respectively.
Figure 4B:
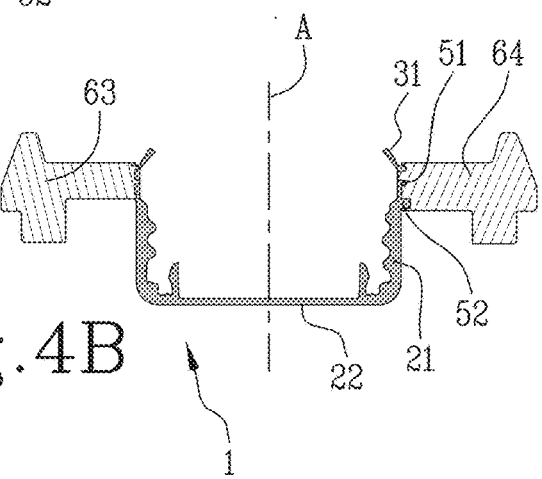
Figure 5A:
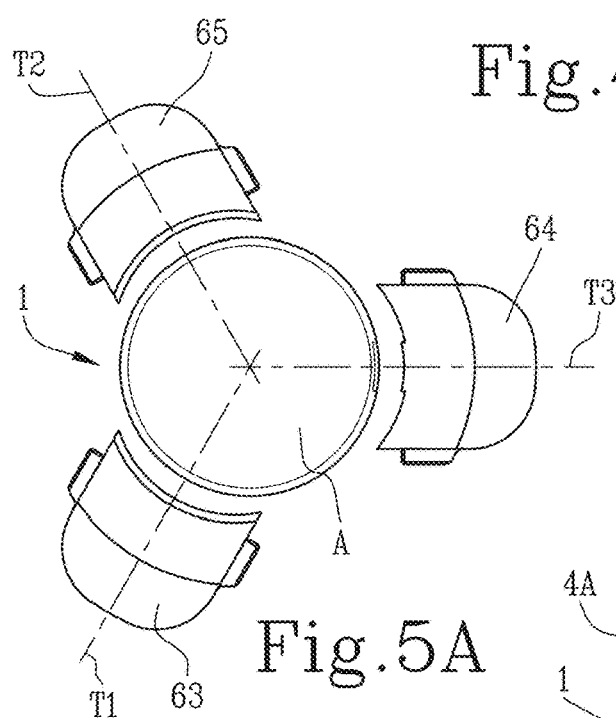
FIGS. 5A and 5B show respective top views of a drawer, an additional drawer and an auxiliary drawer of the mould of FIG. 3 at an open position and at a closed position, respectively.
Figure 5B:
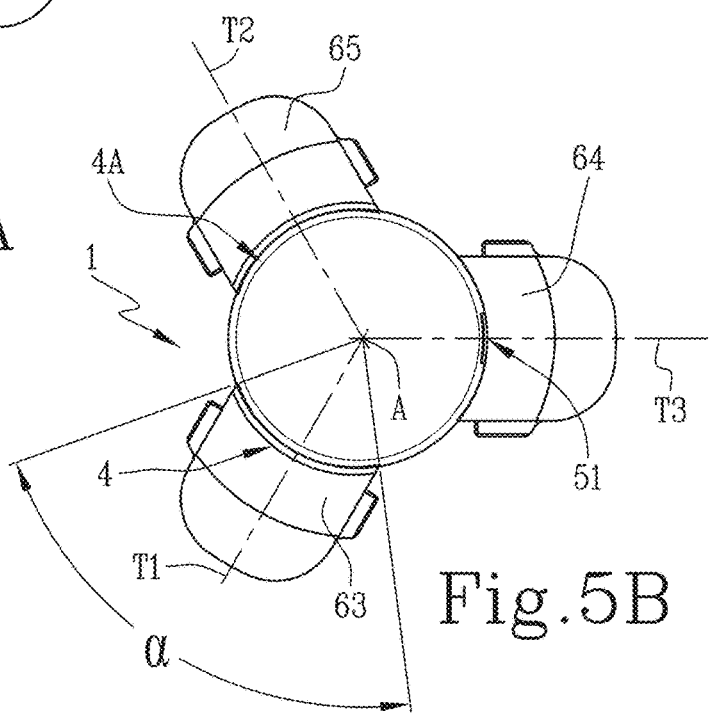
Figure 6:
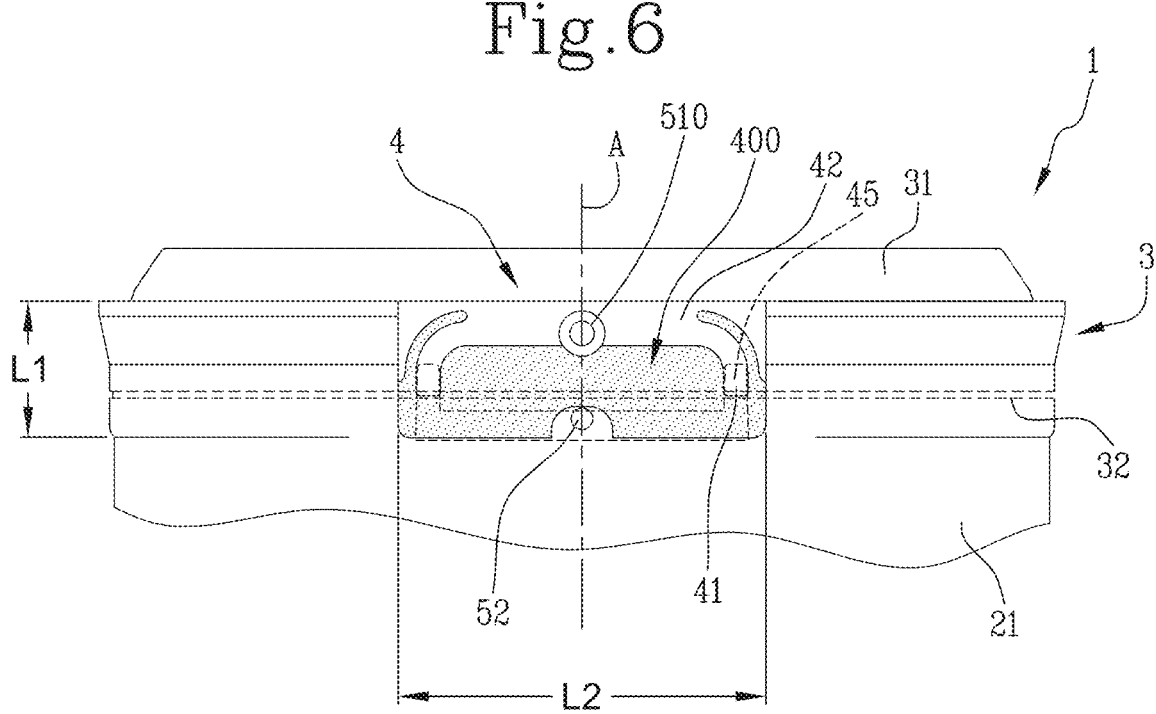
FIGS. 6, 7, 8, 9, 10, 11 show further embodiments of the cap of this disclosure.
Figure 7:
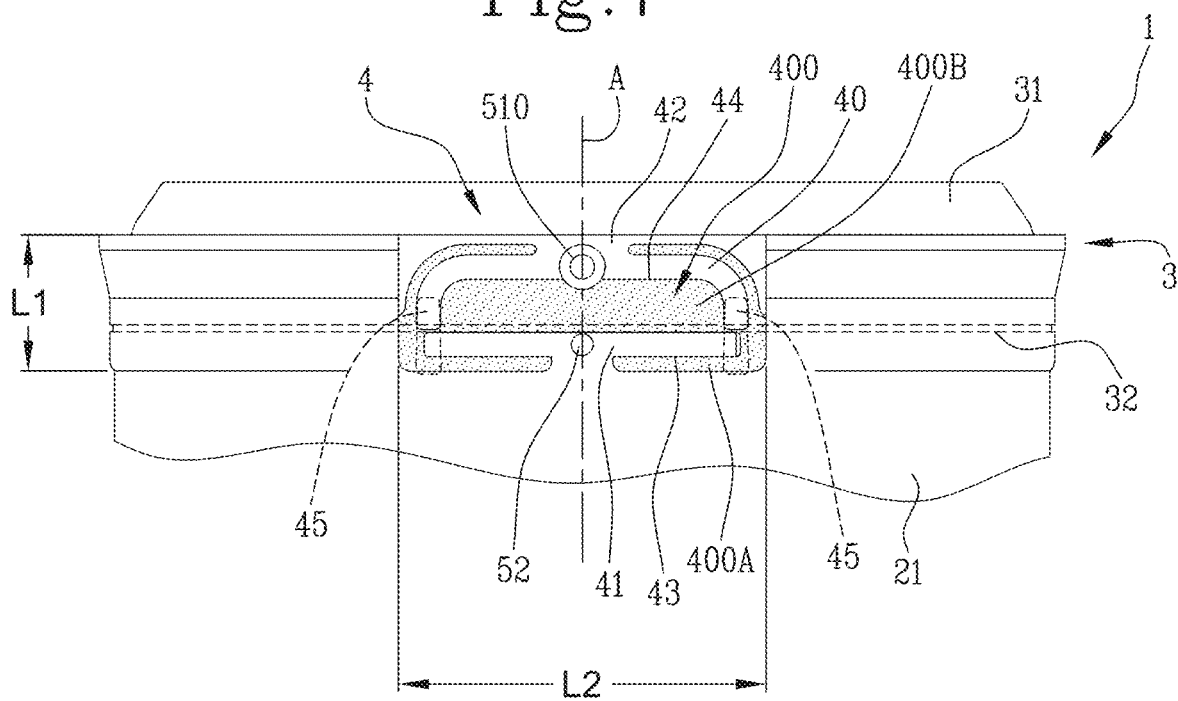
Figure 8:
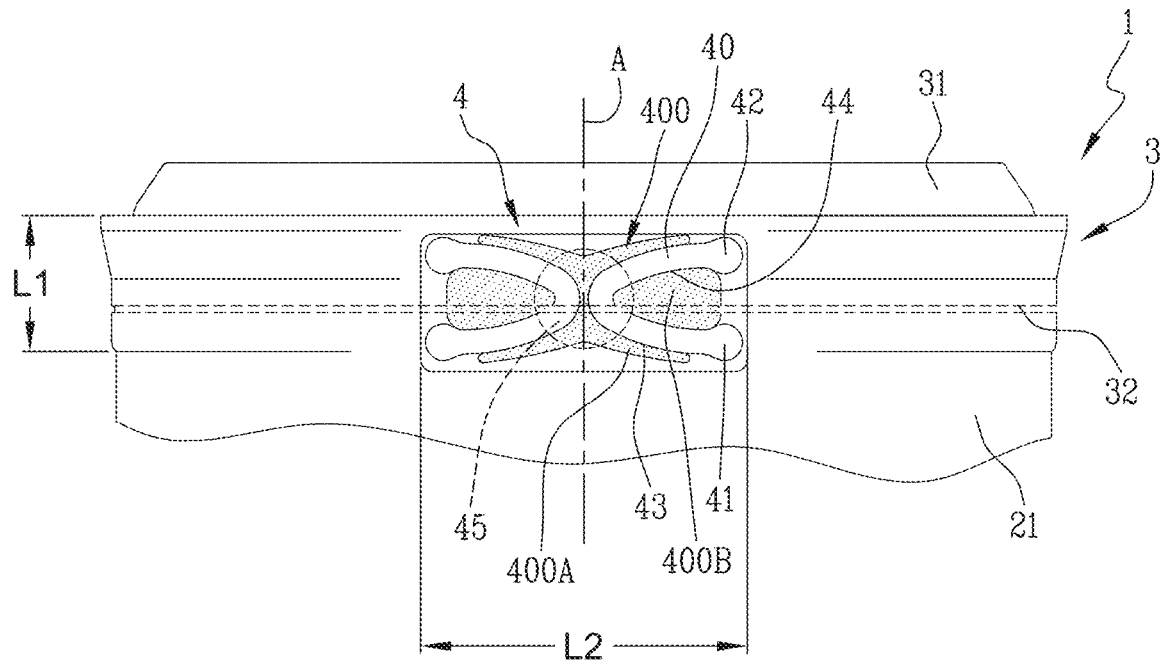
Figure 9:
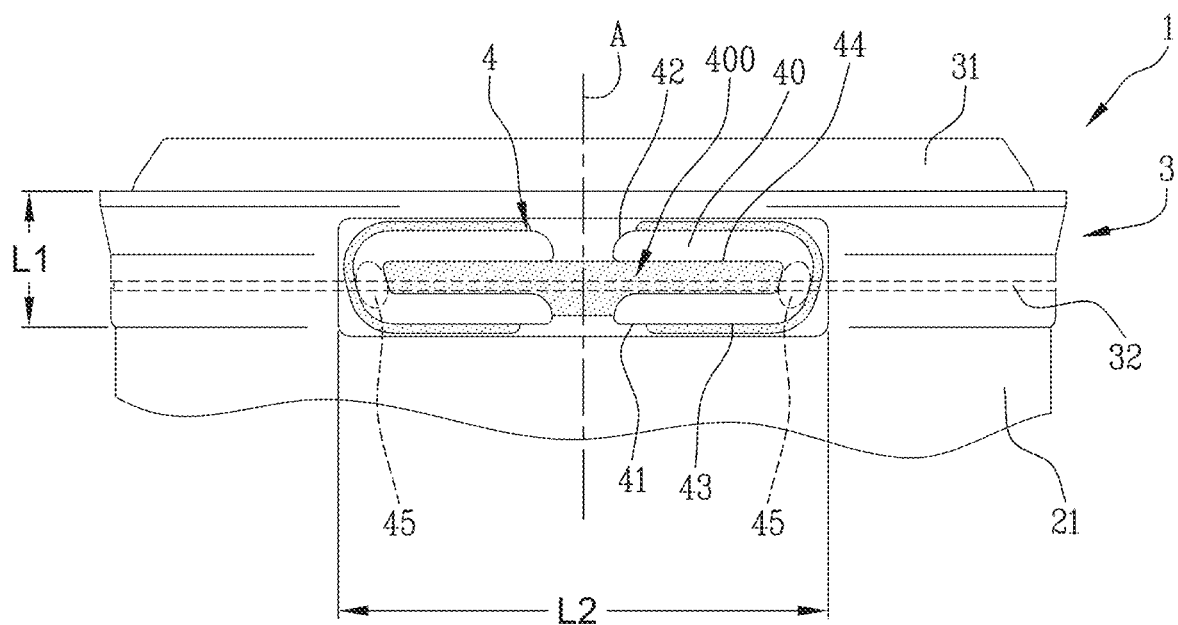
Figure 10:
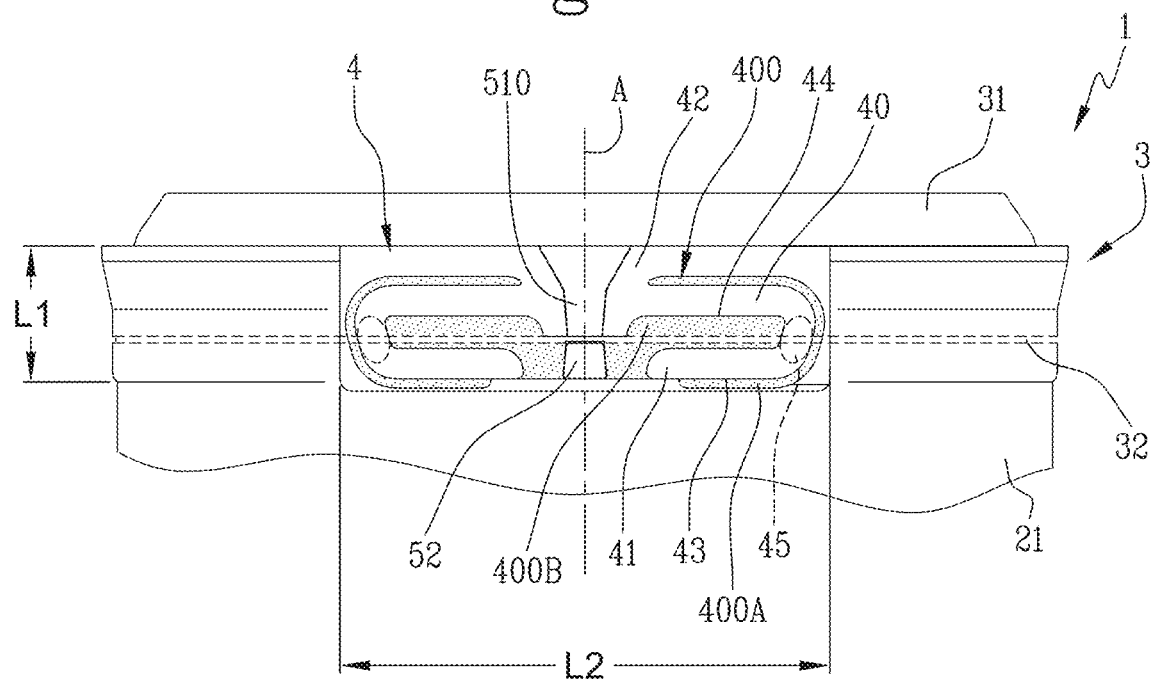
Figure 11:
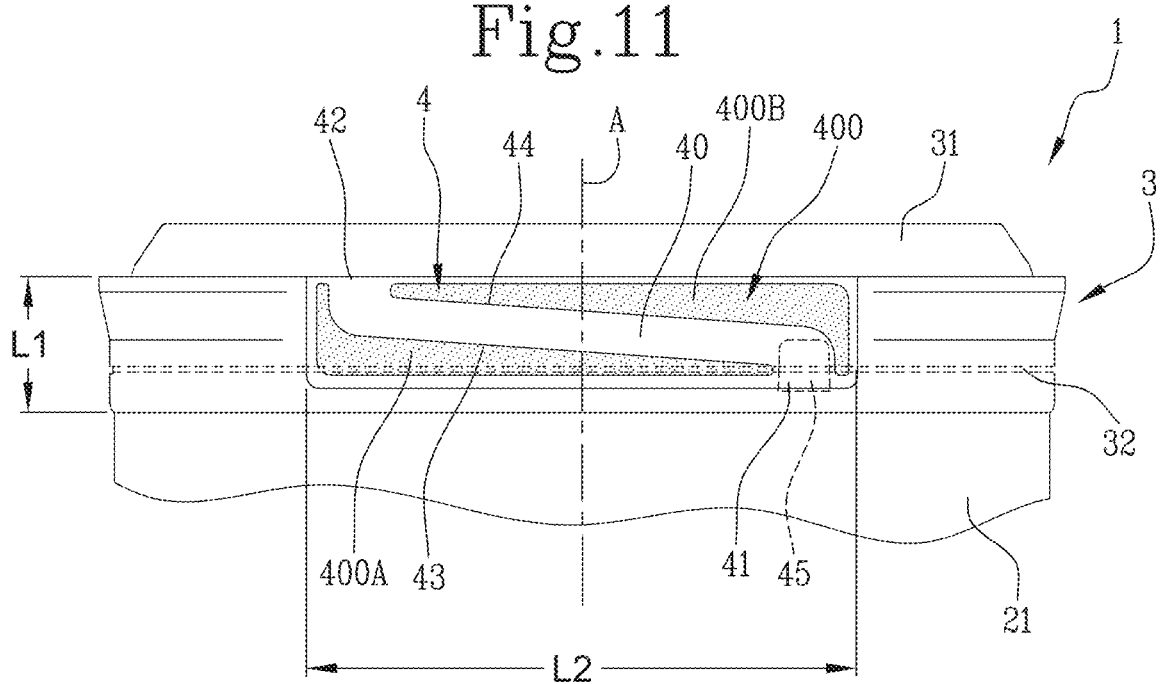
Figure 12A:
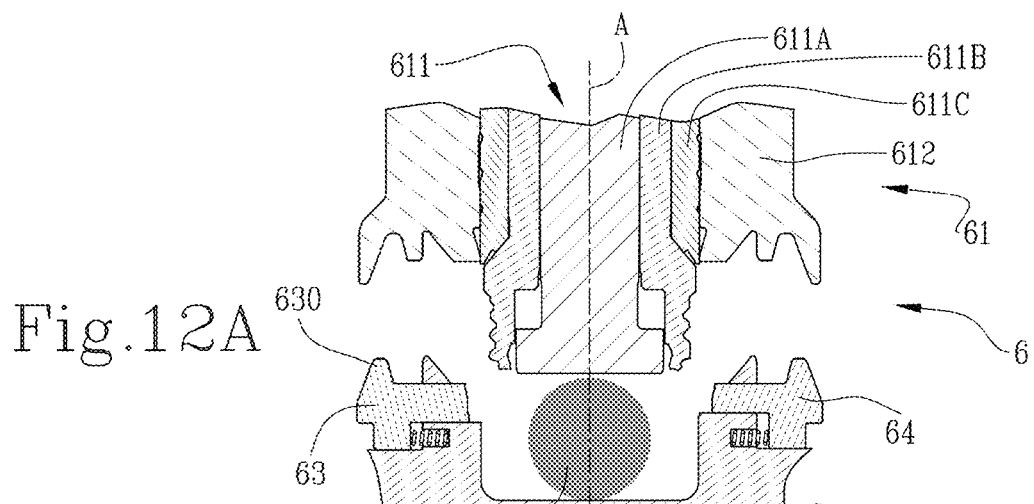
FIGS. 12A, 12B and 12C show the mould of this disclosure in successive instants during its closure.
Figure 12B:
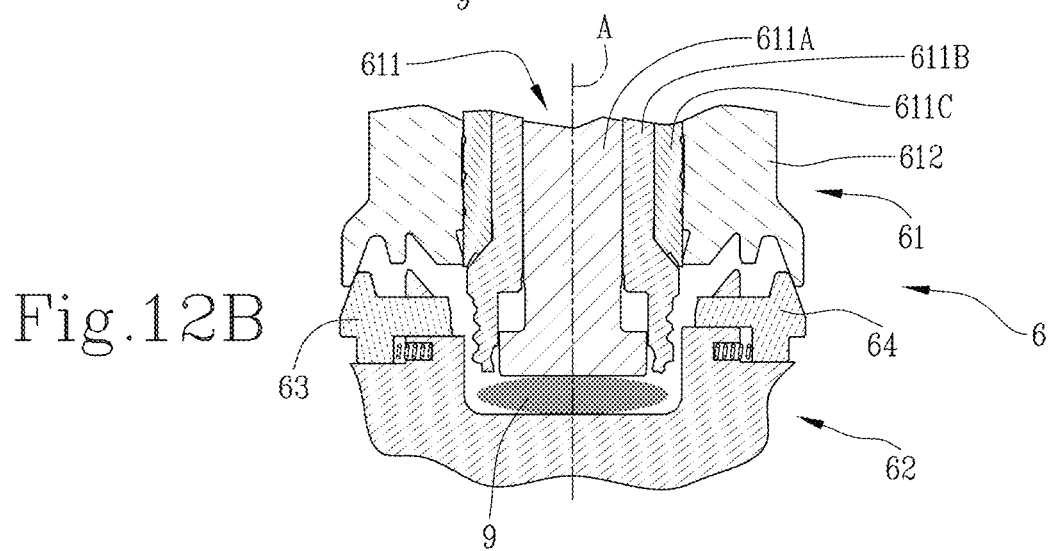
Figure 12C:
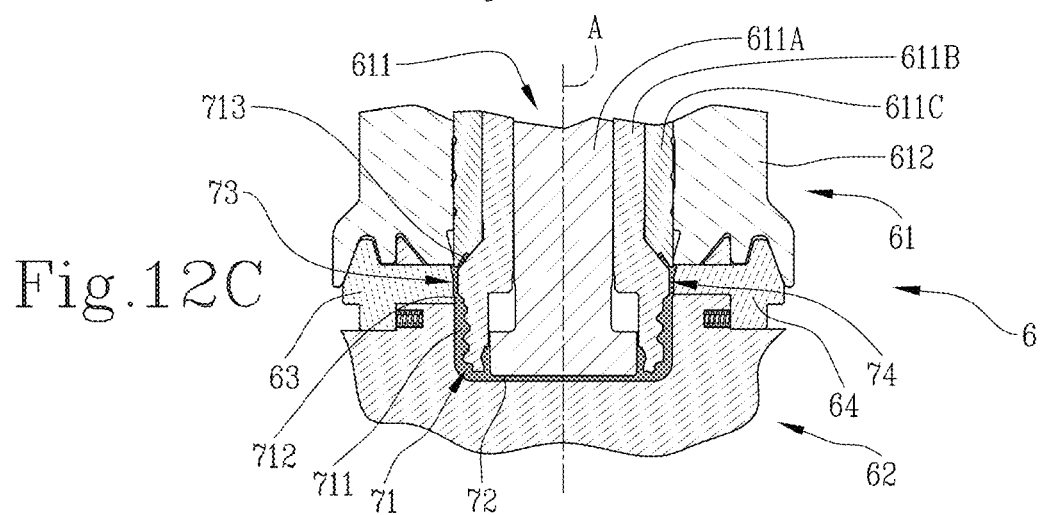

With reference to the accompanying drawings, the numeral 1 denotes a cap (or closure) for a container.

The cap 1 comprises a body 2. The body 2 is configured to be coupled to the neck of the container to close the container and uncoupled from the neck of the container to open the container. The body 2 comprises an internally threaded side wall 21 (that is, comprising an internal thread) to connect to a corresponding thread on the neck of the container. The side wall 21 extends around a longitudinal axis A. The side wall 21 is radially symmetric about the longitudinal axis A. The side wall 21 has a first end, annular in shape, and a second end, opposite to the first end and also annular in shape. The body 2 comprises a transverse wall 22, oriented transversely to the side wall and connected to the first end of the side wall 21. The transverse wall 22 is circular in shape.

The cap 1 comprises a tamper evident ring 3. The tamper evident ring 3 is configured to remain anchored to the neck of the container even when the cap body 2 is uncoupled from the neck. The tamper evident ring 3 includes a retaining portion 31 configured to engage a locking member on the neck of the container; the retaining portion 31 is annular in shape. The tamper evident ring 3 includes a joining portion 32, where the tamper evident ring 3 is joined to the cap body 2. The joining portion 32 includes a plurality of bridges or hinges which connect the retaining portion 31 to the transverse wall 21. The bridges are separated from each other by a corresponding plurality of windows. The joining portion 32 is configured to be torn along a full (circular) perimeter surrounding the longitudinal axis A, in response to a movement of the body 2 away from the tamper evident ring 3 (due to unscrewing the thread of the side wall 21 on the body 2 from the thread on the neck of the container).

The cap 1 also comprises a connecting window 4, formed of a portion of the side wall 21 of the cap body 2, a corresponding portion of the retaining element 31 and the stretch of the joining portion 32 interposed between them. The connecting window 4 has a first dimension L1, along the direction of the longitudinal axis A, and a second dimension L2, along a perimeter surrounding the longitudinal axis A. Preferably, the second dimension L2 is greater than the first dimension L1.

The connecting window 4 includes a connecting band 40. Preferably, the length of the connecting band 40 is greater than the first dimension L1 of the connecting window 4. Preferably, the length of the connecting band 40 is greater than the second dimension L2 of the connecting window 4.

The connecting band 40 extends between a first end 41, connected to the side wall 21 of the body 2, and a second end 42, connected to the retaining portion 31 of the tamper evident ring 3. The connecting band 40 has a first flank 43 and a second flank 44, opposite to the first flank 43.

The connecting window 4 includes a film 400. The film 400 has a reduced thickness compared to the connecting band 40; the film 400 is adjacent to the first and second flanks 43, 44 of the connecting band 40 and connects the first and second flanks 43, 44 of the connecting band 40 to respective portions of the cap body 2 side wall 21 and of the retaining element 31 which surround the connecting window 4.

More specifically, in one or more embodiments, the film 400 includes a first film portion 400A, connected to the first flank 43 of the connecting band 4 and to respective portions of the cap body 2 side wall 21 and of the retaining element 31 which surround the connecting window 4. The film 400 also includes a second film portion 400B, connected to the second flank of the connecting band 40 and to respective portions of the cap body 2 side wall 21 and of the retaining element 31 which surround the connecting window 4.

In one or more embodiments, the connecting window 4 includes a plurality of connecting bands 40 (for example, a first and a second connecting band 40), connected to the film 400 (more specifically, to the first film portion 400A and to the second film portion 400B). In the case where they are provided, the first connecting band 40 and the second connecting band 40 are preferably symmetrical about a longitudinal axis of the connecting window 4, parallel to the longitudinal axis A.

Each connecting band 40 may have the shape of a loop or a hairpin bend, inside the connecting window 4; more specifically, each connecting band may include a first straight stretch, which starts at the first end 41, a second straight stretch, which reaches the second end, and a curved zone interposed between the first straight stretch and the second straight stretch. In the case where a first connecting band 40 and a second connecting band 40 are provided, the respective curved zones may be located at opposite ends of the connecting window 4 relative to the longitudinal axis of the connecting window 4; in another embodiment, the first ends and the second ends may be located at opposite ends of the connecting window 4 relative to the longitudinal axis of the connecting window 4.

Preferably, the cap 1 includes a fastening element and a protrusion 52 extending radially away from the longitudinal axis A. In an embodiment, the fastening element is provided in the tamper evident ring 3 and the protrusion 52 is provided in the cap body 2; in another embodiment, the fastening element is provided in the cap body 2 and the protrusion 52 is provided in the tamper evident ring 3. The fastening element is configured to releasably engage the protrusion 52 so as to keep the cap body 2 at a flipped over position relative to the tamper evident ring 3.

More specifically, in an embodiment, the fastening element defines a recess 510 (or hollow), configured to receive the protrusion 52. In another embodiment, the fastening element includes a tooth 51 and the protrusion 52 defines a recess (for example, the cap might include a pair of protrusions 52 defining the recess between them), where the recess of the protrusion 52 is configured to receive and retain the tooth 51.

In an embodiment, the fastening element 51, 510 and the protrusion 52 are made on the inside of the connecting window 4. In another embodiment, the fastening element 51, 510 and the protrusion 52 are made on the outside of the connecting window 4 (at a certain distance from it).

In an embodiment, the cap comprises an additional connecting window 4A, including an additional connecting band and an additional film. The respective second ends 42 of the connecting band 40 and of the additional connecting band (connected to the tamper evident ring 3) are disposed in the retaining portion 31 of the tamper evident ring 3, at the ends of a circular arc of less than 180 degrees (preferably less than 160 degrees). The fastening element 51, 510 (or, alternatively, the protrusion 52) is interposed between the second ends relative to the circular arc.

Preferably, the respective second dimensions L2 of the connecting window 4 and of the additional connecting window 4A are each at least 60 degrees measured along an arc 'α' around the longitudinal axis A.

It should be noted that the side wall 21 of the cap body 2 and the tamper evident ring 3 define an inside surface S that faces towards the longitudinal axis A. In one or more embodiments, the connecting band 4 has an increased thickness zone 45, protuberant radially from the inside surface S at a cutting plane orthogonal to the longitudinal axis A and passing through the joining portion 32. Thus, the inside wall S has a protuberance at the increased thickness zone 45. Therefore, the inside wall S is not radially symmetrical. Thanks to the increased thickness zone 45, the connecting band 4 remains intact even when the joining zone 32 is cut from the outside of the cap 1.

This disclosure also provides a mould 6 for forming the cap 1.

The mould 6 includes an upper unit 61 and a lower unit 62, movable towards and away from each other along an axis of the mould 6 which, operatively (when the cap 1 is formed in the mould 6), coincides with the longitudinal axis A. More specifically, the upper unit 61 and the lower unit 62 are movable between a spaced-apart position, to define an open configuration of the mould 6, and a close-together position, to define a closed configuration of the mould 6.

The lower unit 62 includes (or defines) a cavity. The cavity is configured to receive a charge 9 of extruded thermoplastic material.

The upper unit 61 includes a core 611. The core 611 is configured to penetrate the cavity of the lower unit 62 when the mould 6 is in the closed configuration.

More specifically, the core 611 includes an inner core 611A, a central core 611B and an outer core 611C. The outer core 611C surrounds the central core 611B which in turn surrounds the inner core 611A. The inner core 611A, central core 611B and the outer core 611C are movable relative to each other along the longitudinal axis A; more specifically, in a possible embodiment, the inner core 611A and the outer core 611C are stationary, whilst the central core 611B is movable.

The upper unit 61 also includes an extractor 612, which surrounds the core 611 and is movable relative to the core 611 (that is, relative to the inner core 611A, the central core 611B and the outer core 611C) along the longitudinal axis A. The central core 611B includes a plurality of recesses configured to form the internal thread on the side wall of the cap.

In a sequence in which the mould 1 is opened, there is first of all a downward movement of all the components except the outer core 611C and the inner core 611A (in practice equivalent to an upward movement of the outer core 611C and of the inner core 611A); at this stage, the central core 611B and the cavity of the lower unit 62 remain adherent to the cap 1. After that, a specific actuator causes a downward movement of the lower unit 62 away from the upper unit 61 and from the cap 1, thereby releasing an outside wall of the cap 1; at this stage, the central core 611B remains adherent to an inside wall of the cap 1. After that, the extractor 612 moves downwards and, being in contact with the upper edge of the cap 1, entrains the cap 1 downwards with it; at first, the cap 1, pushed downwards by the extractor 612, entrains the central core 611B with it until the central core 611B reaches a stop shoulder (defined, for example, by the inner core 611A, which is stationary). When the central core 611B reaches the stop shoulder, the extractor 612 continues moving downwards and (if necessary with the aid of compressed air injected between the inner core 611A and the central core 611B) elastically deforms the side wall of the cap 1, until extracting the internal thread from the recesses of the central core 611B and releasing the inside wall of the cap 1. To form the connecting window 4, the mould 6 includes a drawer 63. The drawer 63 is movable along a first transverse axis T1, oriented radially relative to the longitudinal axis A. The drawer 63 (at the end of it facing towards the longitudinal axis A) has a top surface with a groove made in it. When the mould 6 is at the closed position, where the upper unit 61, the lower unit 62 and the drawer 63 are close together, the top surface of the drawer 63 delimits the outside of a connecting zone 73 of the forming cavity 7; the connecting zone 73 is configured to form the connecting window 4.

In the embodiment illustrated, the drawer 63 has a contoured portion 630 which is configured to interact with a corresponding portion of the upper unit 61 (specifically, of the extractor 612) so that a longitudinal movement of the upper unit 61 towards the closed configuration of the mould 6 causes the drawer 63 to move transversely towards the closed configuration of the mould 6. Thus, the drawer 63 is supported by the lower unit 62 but is moved by the upper unit 61.

More specifically, the cap 1 includes an elastic device (for example, a spring or a plurality of springs) associated with the drawer 63 and configured to push the drawer 63 towards its retracted position, away from the longitudinal axis A. When the contoured portion 630 comes into contact with the upper unit 61, the upper unit 61 applies on the drawer 63 a force that moves it to the advanced position, towards the longitudinal axis A, and overcomes the force of the spring or springs.

To form the additional connecting window 4A, the mould 6 includes an additional drawer 65. The additional drawer 65 is movable along a second transverse axis T2, oriented radially relative to the longitudinal axis A. The additional drawer 65 (at the end of it facing towards the longitudinal axis A) has a top surface with a groove made in it. When the mould 6 is at the closed position, where the upper unit 61, the lower unit 62 and the additional drawer 65 are close together, the top surface of the additional drawer 65 delimits the outside of an additional connecting zone 74 of the forming cavity 7; the additional connecting zone 74 is configured to form the additional connecting window 4A.

The additional drawer 65, too, has a contoured portion which is configured to interact with a corresponding portion of the upper unit 61 so that a longitudinal movement of the upper unit 61 towards the closed configuration of the mould 6 causes the additional drawer 65 to move transversely towards the closed configuration of the mould 6.

More specifically, the cap 1 includes an elastic device (for example, a spring or a plurality of springs) associated with the additional drawer 65 and configured to push the additional drawer 65 towards its retracted position, away from the longitudinal axis A. When the contoured portion of the additional drawer comes into contact with the upper unit 61, the upper unit 61 applies on the additional drawer 65 a force that moves it to the advanced position, towards the longitudinal axis A, and overcomes the force of the spring or springs.

To form the fastening element 51, 510 and the protrusion 52 (if these are provided on the outside of the connecting window 4), the mould 6 may include an auxiliary drawer 64, movable transversely to the longitudinal axis A along a third transverse axis T3; when the mould 6 is at a closed position, where the upper unit 61, the lower unit 62 and the auxiliary drawer 64 are close together, a top surface of the auxiliary drawer 64 delimits the outside of a portion of the forming cavity 7 to form at least one protuberant zone and one contoured zone in the forming cavity (the protuberant zone being configured to form the protrusion 52 and the contoured zone being configured to form the fastening element 51, 510).

The auxiliary drawer 64, too, has a contoured portion which is configured to interact with a corresponding portion of the upper unit 61 so that a longitudinal movement of the upper unit 61 towards the closed configuration of the mould 6 causes the auxiliary drawer 64 to move transversely towards the closed configuration of the mould 6.

More specifically, the cap 1 includes an elastic device (for example, a spring or a plurality of springs) associated with the auxiliary drawer 64 and configured to push the auxiliary drawer 64 towards its retracted position, away from the longitudinal axis A. When the contoured portion of the auxiliary drawer comes into contact with the upper unit 61, the upper unit 61 applies on the drawer 64 a force that moves it to the advanced position, towards the longitudinal axis A, and overcomes the force of the spring or springs.

Preferably, the third transverse axis T3 is interposed between, and angularly equidistant from, the first and the second transverse axis T1, T2.

In an embodiment, the first, second and third transverse axes T1, T2, T3 are angularly equispaced around the longitudinal axis A. In other embodiments, the angle made by the third transverse axis T3 with the first transverse axis T1 is equal to the angle made by the third transverse axis T3 with the second transverse axis T2 but smaller than the angle made by the first transverse axis T1 with the second transverse axis T2.

The inside of the mould 6 defines a forming cavity 7 for forming the cap 1 from the charge 9. The forming cavity 7 includes a side hollow 71, extending around the longitudinal axis A, and a transverse hollow 72, oriented transversely to the side hollow 71 and connected to one end of the side hollow 71. The transverse hollow 72 is configured to form the transverse wall 22 of the cap 1. The side hollow 71 includes a body zone 711, a joining zone 712 and a tamper evidence zone 713. The body zone 711, the joining zone 712 and a tamper evidence zone 713 each extend around the longitudinal axis A (and are thus annular in shape). The joining zone 712 is interposed between the body zone 711 and the tamper evidence zone 713. The body zone 711 has a first end which is connected to the transverse hollow 72 and a second end which is connected to the joining zone 712. It should be noted that the joining zone 712 is configured to create the joining portion 32 of the cap 1; the joining zone 712 is configured to create a pre-weakened portion in the joining zone 712 or, alternatively, the pre-weakened portion is created after forming (for example, with a cutting device).

The forming cavity 7 also includes the connecting zone 73 formed of respective portions of the cap body zone 711, of the joining zone 712 and of the tamper evidence zone 713 confronted by the drawer 63. The connecting zone 73 includes a connecting portion (configured to form the connecting band 4) and a reduced thickness zone (configured to form the film 400) surrounding the connecting portion.

The forming cavity 7 may also include the additional connecting zone 74 formed of respective portions of the cap body zone 711, of the joining zone 712 and of the tamper evidence zone 713 confronted by the additional drawer 65. The additional connecting zone 74 includes a connecting portion (configured to form the additional connecting band) and a reduced thickness zone (configured to form the additional film) surrounding the connecting portion.

The forming cavity 7 may also include the protuberant zone and the contoured zone formed of respective portions of the cap body zone 711, of the joining zone 712 and of the tamper evidence zone 713 confronted by the auxiliary drawer 64.

In an embodiment (not illustrated) the mould 1 comprises a plunger associated with the lower unit 62. The plunger is movable relative to the lower unit 62 between a retracted position, where it acts in conjunction with the lower unit 62 to form the cavity that receives the charge 9, and an advanced position, where it at least partly occupies the cavity defined by the lower unit 62. The plunger is movable along a respective axis which may be parallel or transverse to the longitudinal axis A. The mould 1 may also comprise a thrust actuator connected to the plunger to move it from the retracted position to the advanced position, thereby squeezing the charge 9 so that the plastic material is forced to occupy the forming space 7. Instead of providing the actuator, the plunger, too, might be moved by the effect of the relative movement between the lower unit and the upper unit (by means of specific contoured portions).

In this context, the step of forming the cap would include the following sub-steps:

positioning at least part of the charge 9 in the forming cavity;

closing the mould 1 to form a closed forming space delimited by the upper unit 61 and the lower unit 62; the step of closing the mould comprises moving the lower unit and the upper unit towards each other and simultaneously advancing the drawer 63 (and, if provided, the additional drawer 65 and/or the auxiliary drawer 64) from the retracted position to the respective advanced position;

moving the plunger from the retracted position to the advanced position to squeeze the charge 9 so that the plastic material is forced to occupy the forming space.

The movement of the plunger might be synchronized with the movement of the upper unit 61 and lower unit 62 (hence of the drawer 63, of the additional drawer 65 and/or of the auxiliary drawer 64) towards each other, or it might be performed after the movement of the upper unit 61 and lower unit 62.

What is claimed is:

1. A cap for a container, comprising:
   a body configured to be coupled and uncoupled relative to a neck of the container and including:
     a side wall internally threaded and extending around a longitudinal axis between a first and a second end, and
     a transverse wall joined to the first end of the side wall;
   a tamper evident ring configured to remain anchored to the neck of the container even when the cap body is uncoupled from the neck, the tamper evident ring including:
     a retaining elemental configured to engage a locking member on the neck of the container, and a joining portion where the tamper evident ring is joined to the cap body, the joining portion being configured to be torn along a perimeter surrounding the longitudinal axis in response to a movement of the body away from the tamper evident ring; and a connecting window formed of a portion of the side wall of the cap body, a corresponding portion of the retaining element, and a stretch of the joining portion interposed between them, wherein the connecting window has a first dimension along the direction of the longitudinal axis, and a second dimension along a perimeter surrounding the longitudinal axis, and wherein the connecting window includes:

a connecting band which is greater in length than the first dimension of the connecting window, the connecting band having a first end connected to the side wall of the cap body, a second end connected to the retaining portion of the tamper evident ring, a first flank, and a second flank opposite to the first flank, each of the first flank and the second flank extending from the first end to the second end of the connecting band; and a film having a reduced thickness compared to the connecting band and being adjacent to the first flank and the second flank of the connecting band along the whole length of the first flank and the second flank of the connecting band from the first end to the second end, to join the first flank and the second flank of the connecting band to respective portions of the cap body side wall and of the retaining element which surround the connecting window, wherein the cap is adapted to be positioned in:

a first working configuration, where the retaining portion of the tamper evident ring engages the locking member of the container neck, so that the cap body is coupled to the container neck and the joining portion of the tamper evident ring and the film of the connecting window are intact, and a second working configuration, where the retaining portion of the tamper evident ring engages the locking member of the container neck, so that the cap body is uncoupled from the container neck, the joining portion of the tamper evident ring and the film of the connecting window are torn, and the tamper evident ring is joined to the cap body by the connecting band.

2. The cap according to claim 1, wherein the second dimension of the connecting window is greater than the first dimension of the connecting window.

3. The cap according to claim 1, wherein:

the tamper evident ring includes a fastening element and the cap body includes a protrusion extending radially away from the longitudinal axis or, conversely, wherein the cap body includes a fastening element and the tamper evident ring includes a protrusion extending radially away from the longitudinal axis, and the fastening element and the protrusion are longitudinally aligned in the first working configuration of the cap so that, in the second working configuration of the cap, the fastening element is configured to engage the protrusion so as to keep the cap body at a flipped over position relative to the tamper evident ring.

4. The cap according to claim 3, wherein the fastening element is in the form of a tooth extending radially away from the longitudinal axis, and wherein the cap body includes a pair of protrusions, defining between them a recess for receiving the tooth.

5. The cap according to claim 3, comprising, in addition to the connecting window, an additional connecting window including an additional connecting band, wherein the respective second ends of the connecting band and of the additional connecting band are disposed in the retaining portion of the tamper evident ring, at the ends of a circular arc of less than 180 degrees and wherein the fastening element is interposed between the second ends relative to that circular arc.

6. The cap according to claim 5, wherein the respective second dimensions of the connecting window and of the additional connecting window are each at least 60 degrees measured along an arc ($\alpha$) around the longitudinal axis.

7. The cap according to claim 1, wherein the side wall of the cap body and the tamper evident ring define an inside surface that faces towards the longitudinal axis, and wherein the connecting band has an increased thickness zone, protuberant radially from the inside surface at a cutting plane orthogonal to the longitudinal axis and passing through the joining portion.

8. The cap according to claim 1, wherein the film includes:

a first film portion, interposed between the first flank of the connecting band and respective portions of the cap body side wall and of the retaining element which surround the connecting window; and a second film portion, interposed between the second flank of the connecting band and respective portions of the cap body side wall and of the retaining element which surround the connecting window.

9. The cap according to claim 1, wherein the length of the connecting band is greater than the second dimension of the connecting window.

10. The cap according to claim 1, wherein the compared thicknesses of the film and connecting band are measured in a direction radial to the longitudinal axis.

* * * * *

UNITED STATES PATENT AND TRADEMARK OFFICE
CERTIFICATE OF CORRECTION

PATENT NO. : 11,834,229 B2
APPLICATION NO. : 17/654414
DATED : December 5, 2023
INVENTOR(S) : Zeno Zuffa It is certified that error appears in the above-identified patent and that said Letters Patent is hereby corrected as shown below:

In the Claims

Claim 1, (Column 16, Line 66), delete "elemental" and insert --element--.

Signed and Sealed this
Nineteenth Day of March, 2024

Katherine Kelly Vidal
*Director of the United States Patent and Trademark Office*